United States Patent [19]

Kraus et al.

[11] 4,093,705

[45] June 6, 1978

[54] CONTROL OF CARBON BLACK PRODUCTION

[75] Inventors: Gerard Kraus; Carl J. Stacy; Paul J. Cheng, all of Bartlesville, Okla.

[73] Assignee: Phillips Petroleum Company, Bartlesville, Okla.

[21] Appl. No.: 728,825

[22] Filed: Oct. 1, 1976

[51] Int. Cl.² .................... C01B 31/02; C09C 1/48; G01N 31/00; G01N 29/02
[52] U.S. Cl. .................. 423/450; 423/DIG. 5; 23/230 A; 23/253 A
[58] Field of Search ............. 23/230 A, 253 A, 259.5; 423/449, 450, 461, DIG. 5; 250/574

[56] References Cited

U.S. PATENT DOCUMENTS

| | | | |
|---|---|---|---|
| 2,897,247 | 7/1959 | Marak | 260/683.15 |
| 3,010,794 | 11/1961 | Friaut et al. | 423/275 X |
| 3,790,286 | 2/1974 | Kraus | 356/118 |
| 3,993,447 | 11/1976 | Buss et al. | 23/259.5 |

*Primary Examiner*—O. R. Vertiz
*Assistant Examiner*—Gregory A. Heller

[57] ABSTRACT

Carbon black is produced by heating a carbonaceous feed material to an elevated temperature to decompose the feed material to produce carbon black. A sample of the effluent from the reactor is passed as a suspension of carbon black particles in a gas into an optical cell. A beam of light is directed into the cell, and scattered light is measured at two different locations. A signal representative of the ratio of the two measured scattered light intensities is employed to control the introduction into the reactor of an alkali metal which controls the structure of the carbon black produced.

8 Claims, 5 Drawing Figures

CONTROL OF CARBON BLACK PRODUCTION

It is common practice to produce carbon black by introducing a carbonaceous feed material, such as an aromatic oil, into a carbon black reactor. This feed material is heated to an elevated temperature to form carbon black. Hot combustion gases are normally employed for this purpose. The reactor effluent is a smoke which contains carbon black particles. It is common practic to control the structure of the produced carbon black by introducing an alkali metal, particularly potassium, into the reactor. This is usually accomplished by injecting a salt of the metal into the feed oil. The amount of alkali metal introduced is selected to provide a black having the desired structure. Heretofore, a laboratory measurement of the structure of the black has been made to determine the amount of alkali metal to be introduced. Unfortunately, this procedure requires a substantial amount of time.

In accordance with the present invention, a method is provided for controlling the structure of carbon black in response to a measurement of the structure of the black which is substantially instantaneous. A sample of the produced black is withdrawn from the reactor and passed as a suspension into a photometer. A beam of light is passed through the suspended black, and light scattered at two different angles is measured. A signal is established which is representative of the ratio of the two scattered light intensities. It has been found that this signal is representative of the structure of the carbon black. The ratio signal can be employed to control the rate at which an alkali metal is introduced into the carbon black reactor so as to produce a carbon black having a desired structure.

In the accompanying drawing.

Figure 1:
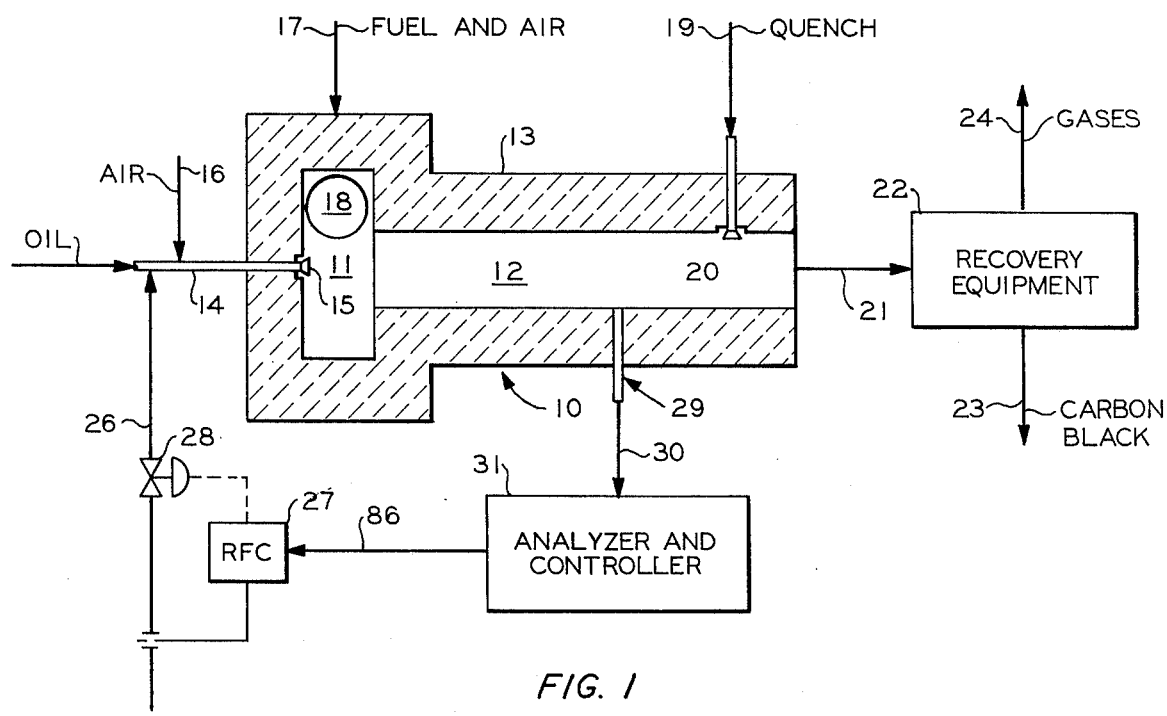
FIG. 1 is a schematic representation of carbon black-producing apparatus having the control system of this invention incorporated therein.

Referring now to the drawing in detail and to FIG. 1 in particular, there is shown a schematic view of a typical furnace carbon black reactor 10. This reactor comprises a cylindrical precombustion section 11 and a cylindrical reaction section 12. Both sections are surrounded by a mass of insulating material 13. A feed oil is introduced through a conduit 14 which terminates in a nozzle 15 adjacent the upstream wall of precombustion section 11. Air, which is employed to assist in atomizing the oil, is introduced through a conduit 16. A mixture of fuel and air, or the combustion products resulting from the burning of such fuel, is introduced through a conduit 17 which communicates with one or more inlet ports 18 in precombustion section 11. The gases introduced through conduit 17 generally enter the precombustion section in a direction tangential to the side wall thereof. A quench material, such as water, is introduced through a conduit 19 which terminates in one or more nozzles 20. The reactor effluent smoke is withdrawn through a conduit 21 and passed to suitable recovery equipment 22. Carbon black is withdrawn through a conveyor 23, and gases are removed through a conduit 24.

The apparatus thus far described is typical of conventional carbon black-producing apparatus. Such apparatus is described in detail in U.S. Pat. No. 2,564,700, for example. However, the invention is not limited to any specific configuration of the carbon black reactor.

It is common practice to introduce an alkali metal, preferably potassium, into the reactor in order to regulate the structure of the produced carbon black. This can be accomplished by introducing the alkali metal through a conduit 26 which communicates with oil conduit 14. The use of an alkali metal for this purpose is well known, and is described in U.S. Pat. No. 3,010,794, for example. In accordance with the present invention, the rate at which the alkali metal is introduced is controlled by a recorder-flow controller 27 which adjusts a valve 28 in conduit 26. The setpoint of controller 27 is ajusted in response to a signal which is representative of the structure of the produced carbon black. This signal is obtained by withdrawing a sample of the smoke from reactor 10 through a probe 29 and passing the sample through a conduit 30 to an analyzer and controller 31. The output signal from analyzer and controller 31 is employed to adjust the setpoint of controller 27.

Figure 2:
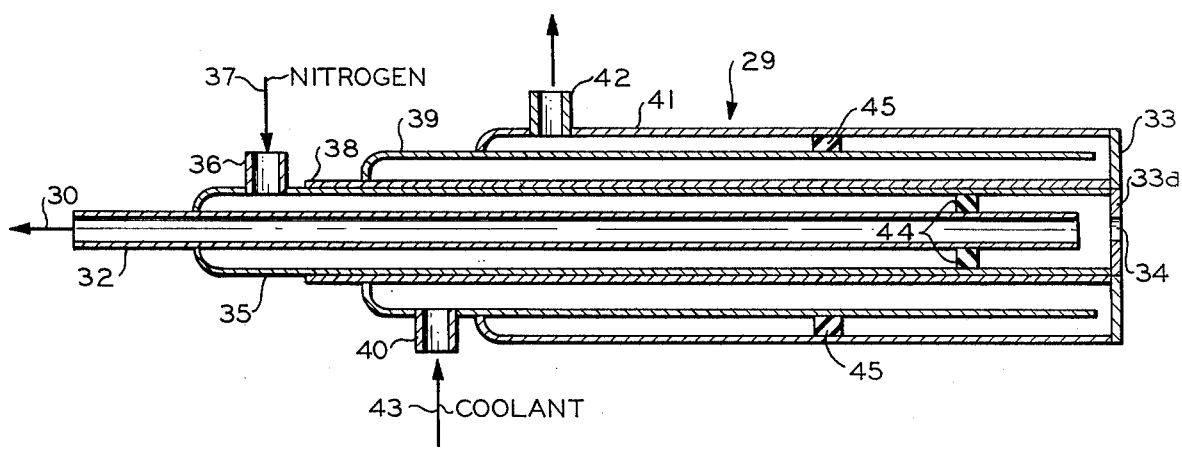
FIG. 2 is a cross-sectional view of the probe which is employed to remove a sample of carbon black from the reactor.

Probe 29 is illustrated in FIG. 2. A central conduit 32 is positioned to terminate adjacent, but spaced from, an end plate which is formed of two rings 33 and 33a, the latter having a central opening 34 therein. This plate is positioned so as to be substantially flush with the wall of reactor section 12 of reactor 10. This permits a sample of the smoke to be withdrawn through opening 34 into conduit 32. Conduit 32 is surrounded by a jacket 35 which engages ring 33a. Jacket 35 is provided with an inlet 36 through which an inert gas, such as nitrogen, is introduced from a conduit 37. This inert gas is supplied at a preselected rate, which preferably is adjustable. The inert gas flows to the right through jacket 35 and then to the left conduit 32. The flow of inert gas serves to transport the sample withdrawn from the reactor out through conduit 32 into conduit 30. A tube 38, which engages plate 33, surrounds jacket 35 and is free to slide on the jacket. A jacket 39 surrounds tube 38 and terminates adjacent plate 33. Jacket 39 is provided with an inlet 40. A jacket 41 surrounds jacket 39 and engages plate 33. Jacket 41 is provided with an outlet 42. A coolant is introduced into inlet 40 from a conduit 43. This coolant flows through jackets 39 and 41 and is removed through outlet 42. A plurality of spacers 44 and 45 can be employed to retain the jackets in proper alignment.

Figure 3:
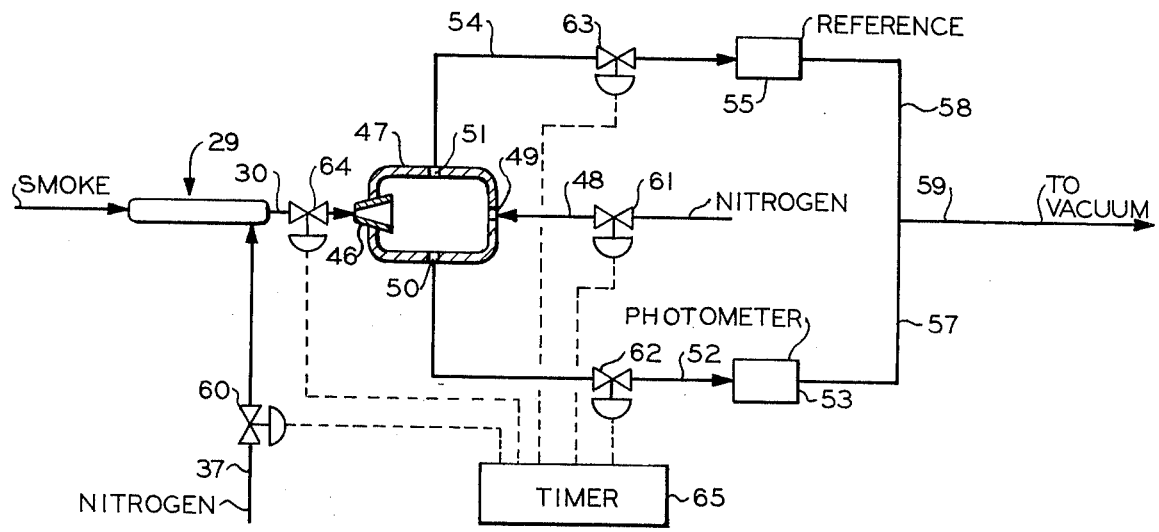
FIG. 3 is a schematic drawing of the carbon black analyzer.

Referring now to FIG. 3, the cooled sample withdrawn through conduit 30 is passed to a nozzle 46 which extends into a chamber 47. Nozzle 46 preferably is adjustable to permit the flow to be varied. A stream of nitrogen, or other inert carrier gas, is passed from a conduit 48 to a port 49 in chamber 47. This chamber is provided with two outlet ports 50 and 51. Port 50 is connected by a conduit 52 to a photometer 53, and port 51 is connected by a conduit 54 to a reference or dummy cell 55. The outlets of 53 and 55 are connected by respective conduits 57 and 58 to a conduit 59. Conduit 59 is connected to a vacuum source, not shown. Control valves 60, 61, 62, 63 and 64 are disposed in respective conduits 37, 48, 52, 54 and 30. These valves are operated by a timer 65 in the sequence to be described hereinafter. Timer 65 can be any conventional timing device which provides output signals to operate the valves. For example, the valves can be solenoid-operated, and the timer can include a plurality of cam-operated switches. During the time that an analysis is being made, a sample of the smoke withdrawn from reactor 10 is passed through photometer 53.

Figure 4:
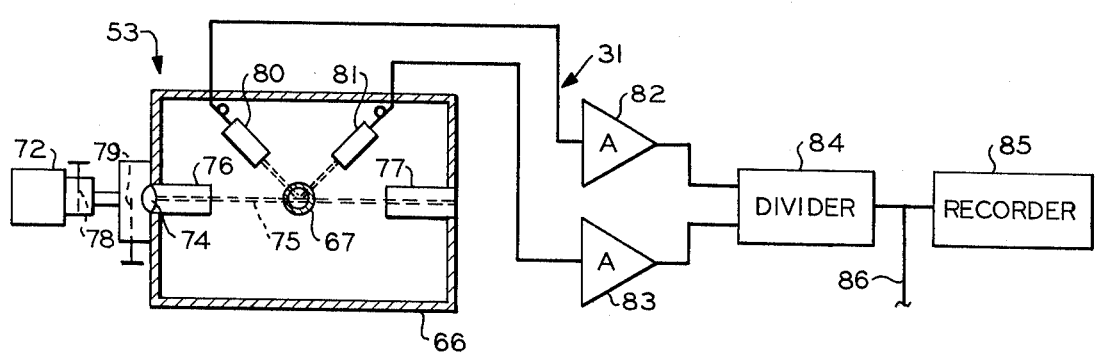
FIG. 4 is a top view, shown partially in section, of the photometer of FIG. 3 and the associated electrical equipment.
Figure 5:
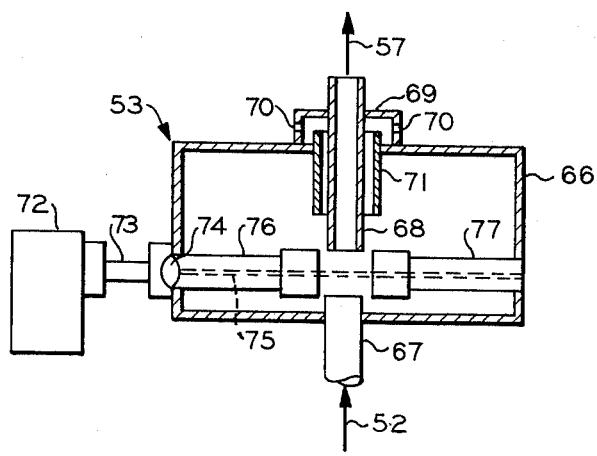
FIG. 5 is a side view, shown partially in section, of the photometer.

Photometer 53 is illustrated in FIGS. 4 and 5. A housing 66 is provided with an inlet conduit 67 which is connected to conduit 52 of FIG. 3. An outlet conduit 68, which is connected to conduit 57, is positioned in spaced relationship with inlet conduit 67 so that a sample of the smoke passes through the space between these ports. A cap 69, which is provided with a plurality of openings 70, extends across the top of housing 66 and surrounds conduit 68. A tube 71 surrounds a portion of conduit 68 and is spaced therefrom. When conduit 57 is connected to the vacuum source, air flows into housing 66 through openings 70, downwardly through tube 71, and is withdrawn through outlet conduit 68. This flow of air assists in removing carbon black from the interior of housing 66.

Light from a source 72 passes through a tube 73 and enters housing 66 through a lens 74 which serves to direct a beam of light through a tube 76 into a light trap tube 77. This beam of light passes immediately above inlet port 67 so as to impinge on carbon black introduced through port 67. Two light detectors 80 and 81, which can be photomultiplier tubes, are positioned within housing 66 so as to detect light scattered from the carbon black at two different angles. In the illustrated embodiment, detector 81 is positioned to detect light scattered at an angle of approximately 45° with respect to the transmitted radiation. Detector 80 is positioned to measure light which is scattered at an angle of approximately 135°. Detectors 80 and 81 are connected to the inputs of respective amplifiers 82 and 83. The outputs of the two amplifiers are connected to the inputs of a divider circuit 84 which establishes a signal which is representative of the quotient of the output signal rom amplifier 83 divided by the output signal from amplifier 82. This signal is applied to a recorder 85 and is also transmitted as the setpoint signal 86 to controller 27 of FIG. 1. The signal detecting and control apparatus of FIG. 4 can be of the type described in U.S. Pat. No. 2,897,247, for example.

In order to obtain reliable measurements of the scattered radiation, it is necessary to have a steady smoke jet in the optical cell. This is somewhat difficult to achieve because of the natural tendency of carbon black particles to clog flow lines to and leading to the cell. The equipment illustrated in FIG. 3 is provided to clean the lines periodically. At the end of an analysis cycle and the beginning of a cleaning cycle, valves 60, 62 and 63 are closed and valves 61 and 64 are open. The results in a flow of purge gas from conduit 48 through chamber 47, conduit 30 and probe 29. This serves to backflush the probe and sample conduit. The next step of the cleaning cycle is accomplished by closing valve 64 and opening valves 62 and 63. The results in purge gas passing through photometer 53 and cell 55. At the end of the cleaning cycle, valve 60 is opened, valve 63 remains open, and valves 61 and 62 are closed. After a few seconds, valve 63 is closed and valve 62 is opened to initiate the analysis cycle. The short delay in opening valve 63 permits stable flow conditions to be established before the analysis is started. Timer 65 also establishes a signal which deactivated the analysis and control equipment during the cleaning cycle. The setpoint of controller 27 thus remains unchanged during the cleaning cycle. Reference cell 55 can be of the same configuration as photometer 53 except that the optical components are not included. Instead, the cell is provided with a window to permit visual observation of the smoke introduced through conduit 54. This enables an operator to adjust flow rates to obtain a stable jet of smoke in the cell and to determine that the cleaning cycle is adequate.

Light source 72 can be a mercury lamp, such as a Type AH-4, for example. Filter 78 can advantageously be selected to transmit radiation in the blue or green region of the visible spectrum. The exact wavelength to be employed is not critical, but this wavelength preferably is of the order of the size of the carbon black particles. Cells 80 and 81 should be spaced to measure scattered light in directions such that there is a substantial angular difference. This is 90° in the illustrated embodiment employing angles of 45° and 135°. It is generally desirable that cell 81 measure light scattered in a "forward" direction and that cell 80 measure light scattered in a "backward" direction. Filter 79 is a neutral filter which is employed merely to adjust the intensity of the transmitted radiation to a desired value.

A number of runs have been carried out to demonstrate this invention. Carbon black was produced in a reactor of the configuration of FIG. 1. Precombustion chamber 11 had a diameter of 15 inches and a length of 4-¾ inches. Reactor section 15 had a diameter of 4 inches. Probe 29 was located 30 inches downstream from the inlet end of section 15. Two inlet ports 18 were employed. The feed oil was a decant oil having a BMCI of 120. This feed oil was preheated to 310° F. (154.4° C.) and charged through an air-atomized bifluid nozzle having a spray of about 20°. The reactor was operated under two sets of conditions, and carbon black was produced having the following properties:

|  | Condition I | Condition II |
|---|---|---|
| Combustion air, scfh | 6000 | 6000 |
| Fuel (natural gas), scfh | 400 | 400 |
| Atomizing air, scfh | 250 | 250 |
| Feed oil, lb./hr. | 70 | 50.4 |
| $N_2SA^{(1)}$, m$^2$/g | 80 | 130 |
| CTAB$^{(2)}$, m$^2$/g | 79 | 112 |
| 24M4$^{(3)}$, g/100 cc | 95 | 93 |
| Tint$^{(4)}$ | 99 | 119 |
| Smoke concentration, at 2500° F., g/m$^3$ | 13 | 7.5 |
| at 80° F., g/m$^3$ | 70 | 41 |

$^{(1)}$ASTM D 3037-71T, Method A.
$^{(2)}$Janzen, J. and Kraus, G., Rubber Chemistry and Technology, 44, 1287 (1971).
$^{(3)}$U.S. 3,548,454, as measured after crushing, by Method B, ASTM 2414-70.
$^{(4)}$ASTM D 3265-75.

The smoke removed through probe 29 was cooled to about 80° F. (26.7° C.).

The measuring apparatus was of the configuration shown in FIG. 4. The light transmitted into the cell had a wavelength of 546.1 nm.

A series of runs was conducted wherein carbon black was produced both with and without the addition of potassium (as potassium nitrate solution with distilled water) to the feed oil. The results were as follows:

| Oil Rate lb./hr. | K ppm$^{(1)}$ | CTAB | 24M4 | Z$^{(3)}$ |
|---|---|---|---|---|
| 70 | 0 | 80 | 94 | 4.61 |
| 70 | 0 | 79 | 95 | 4.68 |
| 70 | 0 | 82 | 92 | 4.69 |
| 70 | 10 | 84 | 85 | 4.04 |
| 70 | 0 | — | — | 4.66 |

-continued

| Oil Rate lb./hr. | K ppm[1] | CTAB | 24M4 | Z[3] |
|---|---|---|---|---|
| 70 | 5 | 82 | 88 | 4.24 |
| 70 | 0 | 79 | 95 | 4.53 |
| 70 | 5 | 81 | 89 | 4.00 |
| 70 | 0 | 79 | 95 | 4.53 |
| 70 | 1 | 81 | 92 | 4.29 |
| 70 | 0 | 80 | 95 | 4.63 |
| 70 | 1 | — | — | 4.43 |
| 50 | 0 | 112 | 93 | 4.31 |
| 50 | 1 | 113 | 94[2] | 4.06 |
| 50 | 0 | — | — | 4.20 |

[1]Parts per million, by weight, of oil.
[2]Value may have been erroneous.
[3]Ratio of intensities detected by cells 81/80.

A blank in the table indicates that samples were not taken.

It can be seen from the foregoing data that changes in the structure of the carbon black, as evidenced by the 24M4 values, due to changes in the amount of potassium added are measured by changes in the light ratio Z. The foregoing runs were conducted over a period of several days so that there are small deviations of Z for the several control runs. However, the runs demonstrated that the measured Z ratio is reduced as the structure is reduced.

While this invention has been described in conjunction with a presently preferred embodiment, it obviously is not limited thereto.

What is claimed is:

1. In a method of producing carbon black by introducing a carbonaceous feed material into a carbon black reactor, heating the feed material to an elevated temperature to decompose the feed material to produce carbon black particles, and withdrawing from the reactor an effluent stream which contains carbon black particles, the improvement which comprises controlling the structure of the thus produced carbon black particles by:

withdrawing a sample of the reactor effluent from said effluent stream and passing the thus withdrawn sample to an analysis zone, said sample containing carbon black particles;

introducing a beam of light into the analysis zone to impinge on the sample therein;

measuring the intensity of light scattered from the sample in said analysis zone in two different directions;

establishing a signal representative of the ratio of the two measured intensities; and introducing an alkali metal into the reactor at a rate which is a function of the established signal so as to tend to maintain the established signal substantially constant at a predetermined value.

2. The method of claim 1 wherein the scattered light is measured in a first direction at an angle of less than 90° with respect to light transmitted through the sample and at an angle greater than 90° with respect to light transmitted through the sample.

3. The method of claim 2 wherein said angles are about 45° and about 135°, respectively.

4. The method of claim 1 wherein said alkali metal is potassium and is introduced into the reactor with the feed material.

5. The method of claim 1 wherein the sample of reactor effluent is mixed with an inert gas to form a carbon black suspension which is introduced into the analysis zone.

6. The method of claim 5 wherein the mixture of sample and inert gas are passed through conduit means to said analysis zone, and further comprising periodically interrupting such flow and purging said conduit means by passing a stream of gas therethrough.

7. The method of claim 2 wherein the beam of light impinging on the sample has a wavelength of the approximate order of the size of the particles of carbon black.

8. The method of claim 1 wherein the established signal is representative of the structure of the carbon black particles.

* * * * *